(12) United States Patent
Akashi et al.

(10) Patent No.: US 8,841,873 B2
(45) Date of Patent: Sep. 23, 2014

(54) MOTOR CONTROL DEVICE FOR VEHICLE

(75) Inventors: Yohei Akashi, Chiyoda-ku (JP);
Kazuyuki Tanaka, Chiyoda-ku (JP);
Hideyuki Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 396 days.

(21) Appl. No.: 13/294,567

(22) Filed: Nov. 11, 2011

(65) Prior Publication Data
US 2012/0235612 A1 Sep. 20, 2012

(30) Foreign Application Priority Data
Mar. 18, 2011 (JP) ................. 2011-061017

(51) Int. Cl.
*H02P 6/10* (2006.01)
*H02P 21/05* (2006.01)
*B60L 15/20* (2006.01)

(52) U.S. Cl.
CPC ........... *B60L 15/20* (2013.01); *B60L 2270/145* (2013.01); *H02P 6/10* (2013.01); *B60L 2240/423* (2013.01); *Y02T 10/644* (2013.01); *Y02T 10/7258* (2013.01)
USPC ............................ 318/611; 318/629; 318/632

(58) Field of Classification Search
CPC .......... B60W 30/20; B60W 2050/001; B60W 30/192; B60K 1/02; B60L 15/20; B62D 5/0472; H02P 27/08; H02P 6/10; H02P 21/05; H02P 31/00
USPC ................. 318/611, 619, 621, 623, 629, 632, 318/400.23, 448, 460, 702
See application file for complete search history.

(56) References Cited

U.S. PATENT DOCUMENTS

| | | | | |
|---|---|---|---|---|
| 5,537,967 A | * | 7/1996 | Tashiro et al. | 123/192.1 |
| 5,610,483 A | * | 3/1997 | Obara et al. | 318/139 |
| 6,181,023 B1 | * | 1/2001 | Inoue | 307/10.1 |
| 7,194,344 B2 | * | 3/2007 | Gee et al. | 701/22 |

FOREIGN PATENT DOCUMENTS

| | | |
|---|---|---|
| JP | 10-023614 A | 1/1998 |
| JP | 2000-125410 A | 4/2000 |
| JP | 2000-233668 A | 8/2000 |
| JP | 2002-171778 A | 6/2002 |
| JP | 2007-221896 A | 8/2007 |
| JP | 2010-239681 A | 10/2010 |
| JP | 2010-273508 A | 12/2010 |

OTHER PUBLICATIONS

Preliminary Notice of Reasons for Rejection, dated Mar. 12, 2013, JPA No. 2011-061017.

* cited by examiner

*Primary Examiner* — Bentsu Ro
(74) *Attorney, Agent, or Firm* — Sughrue Mion, PLLC

(57) ABSTRACT

The motor control device includes: a vehicle control device (1) for generating a first torque command value Tref according to state quantities of the vehicle acquired from various sensors (7); a vehicle-resonance-compensation calculation unit (23) for extracting a frequency component generating a vehicle resonance from torque ripple components detected from an electrical angle ω of a motor for traveling (3) by a vehicle resonance component extraction filter (24), and generating a second torque command value Tcmp as a resonance compensation value for carrying out feedback control for the extracted frequency component; and an adder (20) for generating a torque command value Tref_cmp by subtracting the second torque command value Tcmp from the first torque command value Tref, and the motor (3) is controlled according to the torque command value. With this, it is possible to restrain the resonance of the vehicle caused by the torque ripple of the motor (3).

7 Claims, 4 Drawing Sheets

MOTOR CONTROL DEVICE FOR VEHICLE

BACKGROUND OF THE INVENTION

1. Field of the Invention

The present invention relates to a motor control device for vehicle, and more particularly, to a motor control device for vehicle for controlling a motor (electric motor and rotating electric machine) serving as a drive source of a vehicle such as an automobile.

2. Description of the Related Art

It is known that oscillation sources such as a torque ripple generated while a motor is driven generate a resonance of an elastic system such as a suspension of a vehicle in an electric vehicle provided with a motor as a drive source of the vehicle, and a hybrid vehicle provided with both an internal combustion engine and a motor as the drive source of the vehicle. This resonance generates oscillations and noises on the vehicle, resulting in degradation of feel of comfort of passengers.

For example, Japanese Patent Application Laid-open No. Hei 10-23614 proposes a configuration, as a countermeasure for a resonance of a vehicle caused by oscillation sources such as a torque ripple of a motor, for providing torque compensation toward a direction restraining the torque ripple using information on a rotation of the motor.

Moreover, Japanese Patent Application Laid-open No. 2007-221896 proposes a configuration for restraining torque ripple components of a motor torque command value by means of a first-order lag filter using a time constant determined according to a motor rotation speed in order to restrain a torque ripple because the torque ripple according to a variation in the rotation of a motor is generated if the motor torque command value is calculated from an output command value directed to the motor and the rotation speed of the motor.

The resonance of the vehicle refers to a state in which the entire vehicle presents a natural oscillation due to oscillation sources such as a torque ripple on this occasion. The resonance frequency of the vehicle is a natural frequency determined by the weight of the vehicle and spring constants and viscosity coefficients of elastic systems such as suspensions. such as a torque ripple are superposed on the natural resonance In other words, if frequency components of oscillation sources frequency uniquely determined by the vehicle, the superposed frequencies appear as the resonance of the vehicle (see FIG. 4).

The configuration according to Japanese Patent Application Laid-open No. Hei 10-23614 makes a correction of a torque ripple to frequency components other than frequency components of the resonance frequency of the vehicle, and the correction is thus made to the torque ripple components which do not cause oscillations and noises as a result. There is thus a problem that this correction control generates unnecessary higher harmonics, and new oscillations and noises may occur.

The configuration according to Japanese Patent Application Laid-open No. 2007-221896 calculates the torque command value from the output command value directed to the motor and the rotation speed of the motor, and there are thus a problem that the configuration is not suitable for a system driving a motor according to a torque command directed to the motor, and a problem that the first-order lag filter is used, resulting in a correction made to torque ripple components which do not cause oscillations and noises as the vehicle.

SUMMARY OF THE INVENTION

The present invention has been made in view of the above-mentioned problems, and therefore has an object to provide a motor control device for vehicle which can eliminate a resonance of a vehicle caused by oscillation sources such as a torque ripple of a motor.

The present invention provides a motor control device for vehicle for controlling a motor for traveling installed on a vehicle, including: a first torque generation unit for generating a first torque command value for controlling drive of the motor for traveling according to a state quantity of the vehicle supplied from at least one type of sensor provided on the vehicle; a second torque generation unit for extracting a frequency component generating a resonance of the vehicle out of frequency components of an oscillation source of the vehicle generated when the motor for traveling is driven, and generating a second torque command value serving as a resonance compensation value for the first torque command value based on the extracted frequency component; and a drive torque generation unit for subtracting the second torque command value generated by the second torque generation unit from the first torque command value generated by the first torque generation unit, thereby outputting a result of the subtraction as a drive torque command value for the motor for traveling, in which the motor for traveling is driven based on the drive torque command value.

The present invention provides the motor control device for vehicle for controlling the motor for traveling installed on the vehicle, including: the first torque generation unit for generating the first torque command value for controlling the drive of the motor for traveling according to the state quantity of the vehicle supplied from the at least one type of sensor provided on the vehicle; the second torque generation unit for extracting the frequency component generating the resonance of the vehicle out of the frequency components of the oscillation source of the vehicle generated when the motor for traveling is driven, and generating the second torque command value serving as the resonance compensation value for the first torque command value based on the extracted frequency component; and the drive torque generation unit for subtracting the second torque command value generated by the second torque generation unit from the first torque command value generated by the first torque generation unit, thereby outputting the result of the subtraction as the drive torque command value for the motor for traveling, in which the motor for traveling is driven based on the drive torque command value. Therefore, it is possible to eliminate the resonance of the vehicle caused by the oscillation sources such as the torque ripple of the motor, restrain oscillations and noises generated on the vehicle by the resonance, and provide passengers with feel of comfort.

DETAILED DESCRIPTION OF THE PREFERRED EMBODIMENT

[First Embodiment]

A description is now given of a motor control device for vehicle according to a first embodiment of the present invention with reference to the accompanying drawings.

Figure 1:
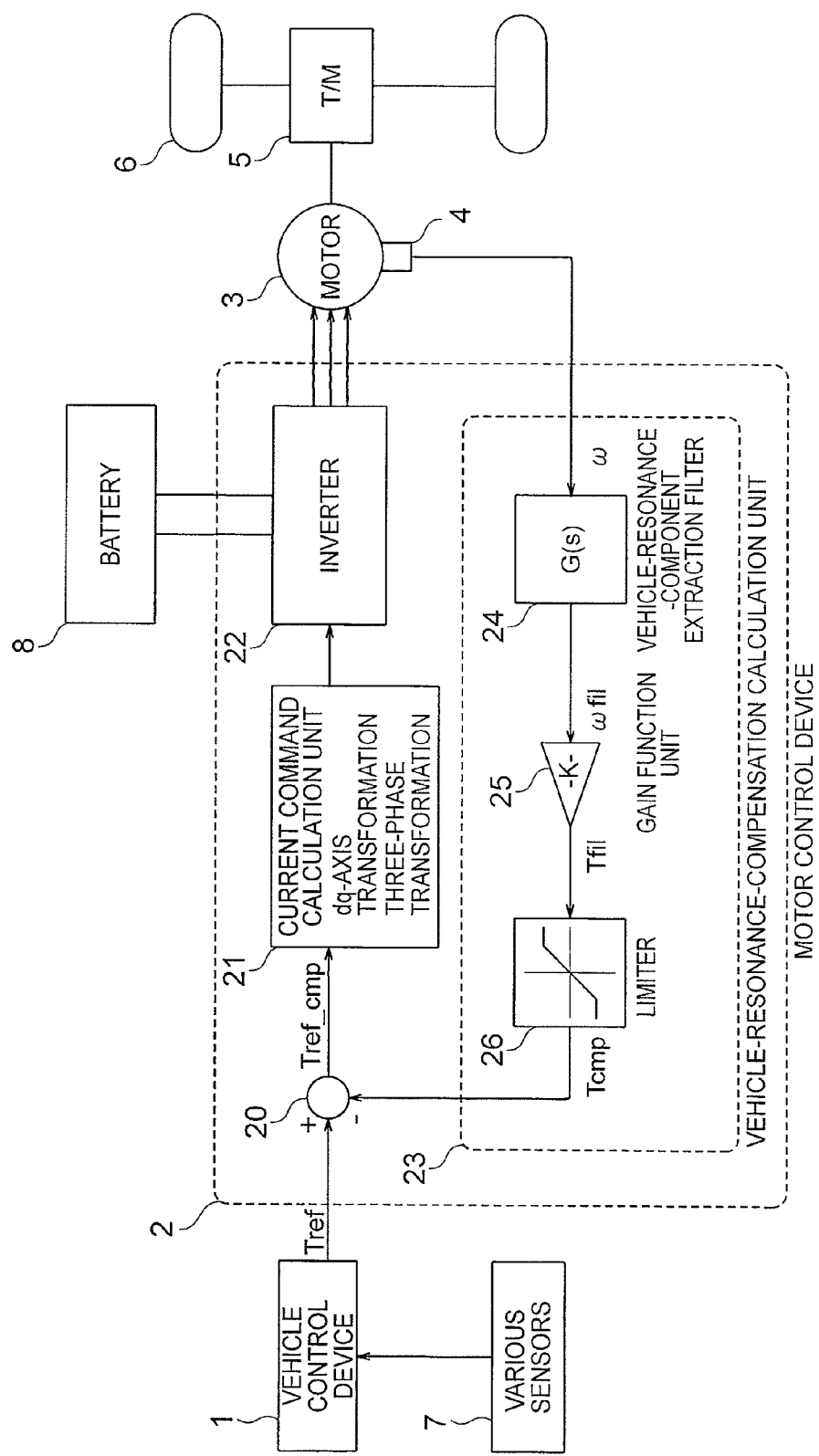
FIG. 1 is an overall configuration diagram illustrating an overall configuration of a vehicle system including a motor control device for vehicle according to a first embodiment of the present invention.

FIG. 1 illustrates an overall configuration of the motor control device for vehicle according to the first embodiment of the present invention, and illustrates one of preferred embodiments.

A vehicle according to this embodiment is an electric vehicle (EV), and an overall configuration thereof is illustrated in FIG. 1. The vehicle to which the present invention is applied is not limited to the electric vehicle, and may be a hybrid vehicle including both an internal combustion engine and a motor. Moreover, instead of having only one motor, the electric vehicle may have in-wheel motors each of which is provided in each of the wheels.

As illustrated in FIG. 1, a vehicle control device 1, a battery 8, and a motor for traveling 3 (electric motor) are connected to a motor control device for vehicle 2 (hereinafter, simply referred to as the motor control device 2) according to the first embodiment of the present invention. The motor control device 2 according to the present invention extracts frequency components generating a vehicle resonance out of frequency components of oscillation sources such as a torque ripple generated during the motor driving, carries out feedback control for the extracted frequency components, and restrains a resonance of the vehicle caused by the oscillation sources of the motor for traveling 3.

The motor for traveling 3 is provided with a motor electrical angle sensor 4 (resolver), and the electrical angle of the motor for traveling 3 is thus detected thereby. Moreover, the motor for traveling 3 is connected to driving wheels 6 via a transmission (T/M) 5, the driving wheels 6 are rotated by the torque of the motor for traveling 3, and the vehicle gains a propulsion force by a reaction force from the ground. The transmission 5 may be a simple speed reduction gear, or may by a speed change gear having a mechanism which can change among several speed reduction ratios on this occasion.

An adder 20, a current command calculation unit 21, an inverter 22, and a vehicle-resonance-compensation calculation unit 23 are provided in the motor control device 2. Moreover, a vehicle-resonance-component extraction filter 24, a gain function unit 25, and a limiter 26 are provided in the vehicle-resonance-compensation calculation unit 23. Note that, the vehicle-resonance-component extraction filter 24 is constructed by a first-order lead/lag filter.

Various sensors 7 are connected to the vehicle control device 1, thereby detecting respective state quantities of the vehicle. An accelerator position sensor (not shown) for detecting a depressed quantity of an acceleration pedal by a driver, a brake position sensor (not shown) for detecting a depressed quantity of a brake pedal, and a vehicle speed sensor (not shown) for detecting the speed of the vehicle are connected to the vehicle control device 1 as the various sensors 7 on this occasion, and the vehicle control device 1 determines a torque command value directed to the motor control device 2 according to input quantities on the accelerator and the brake from the driver and the vehicle speed, and outputs the torque command value as a first torque command Tref. A method of calculating the first torque command value may employ any of well-known technologies which are generally used, and a description thereof is thus omitted. Though the description that the three sensors, that is, the accelerator position sensor, the brake position sensor, and the vehicle speed sensor are provided as the various sensors 7 is given, the various sensors are not limited to this case, and the number of the sensors may be less than three or more than three and the types of the sensors may be other types of sensors than those described herein.

In the motor control device 2, a resonance compensation value for restraining the oscillation caused by the resonance of the vehicle is first calculated by the vehicle-resonance-compensation calculation unit 23, and the resonance compensation value is output as a second torque command Tcmp. The adder 20 then subtracts the second torque command from the first torque command calculated by the vehicle control device 1, thereby calculating a difference between these torque commands. The output from the adder 20 undergoes the dq-axis transformation and the three-phase transformation by the current command calculation unit 21, and based on this, power switching elements (not shown) in the inverter 22 are driven so as to cause a DC component from the battery 8 to output desired three-phase AC waveforms, thereby providing control for driving the motor for traveling 3.

Figure 4:
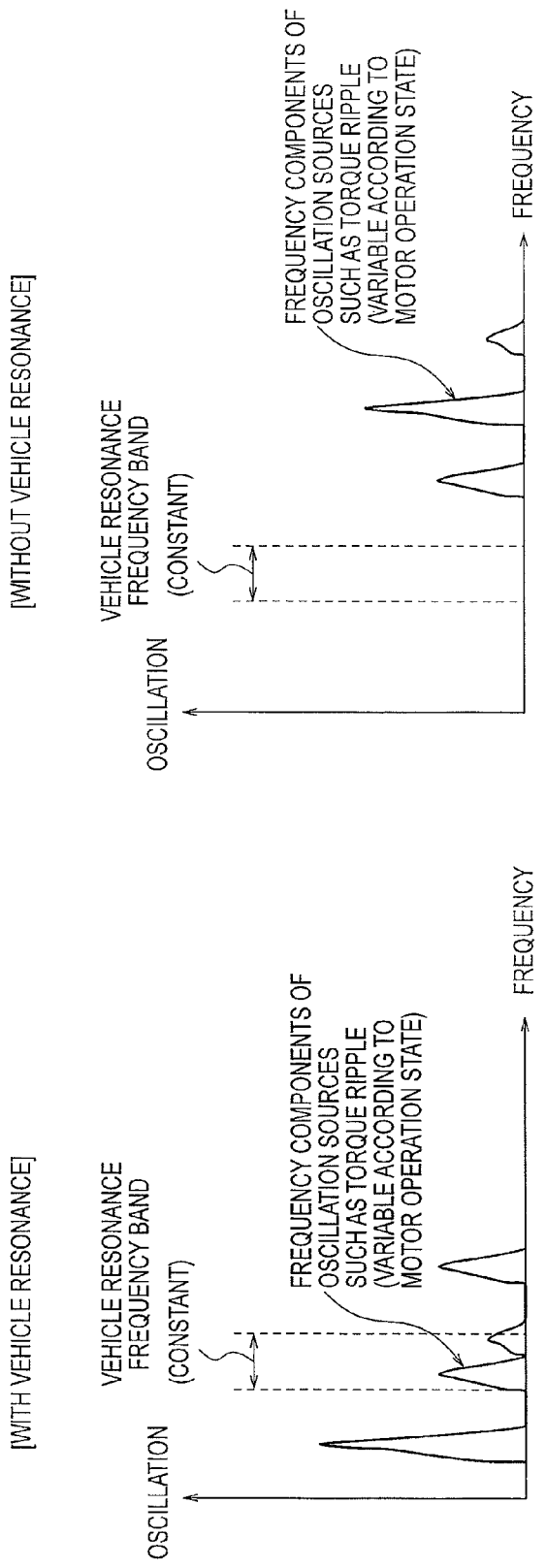
FIG. 4 is an explanatory diagram illustrating a relationship between the resonance frequency of the vehicle and oscillation frequencies such as a torque ripple of a motor according to the first embodiment of the present invention.

A description is now given of a relationship between the torque ripple and the resonance of the vehicle referring to FIG. 4. The torque ripple is basically generated by higher harmonics of the voltage, and it is considered that a majority thereof is generally the 6f component of the motor frequency. As a result, the frequency of the torque ripple changes according to the rotation speed of the motor, and the frequency of the torque ripple also changes according to the motor shape, and the type of windings.

On the other hand, the resonance of the vehicle refers to a state in which the entire vehicle presents a natural oscillation due to oscillation sources such as a torque ripple on this occasion. The resonance frequency of the vehicle is a natural frequency determined by the weight of the vehicle, spring constants and viscosity coefficients of elastic systems such as suspensions. In other words, if frequency components of oscillation sources such as the torque ripple of the motor are superposed on the natural frequency uniquely determined by the vehicle, a resonance of the vehicle appears (see the left chart of FIG. 4). On the other hand, if the frequency components of the oscillation sources such as the torque ripple are not superposed on the natural frequency of the resonance of the vehicle, the resonance of the vehicle does not appear (see the right chart of FIG. 4).

The torque ripple of the motor means that the torque of the motor pulsates. The torque ripple of the motor affects the rotation speed of the motor. From this, it is thus possible to identify the torque ripple component of the motor according to the electrical angle of the motor. The vehicle-resonance-compensation calculation unit 23 carries out the torque compensation by means of feedback control according to the motor electrical angle, thereby removing torque ripple components relating to the resonance of the vehicle. This control is a routine repeated every short period.

Figure 3:
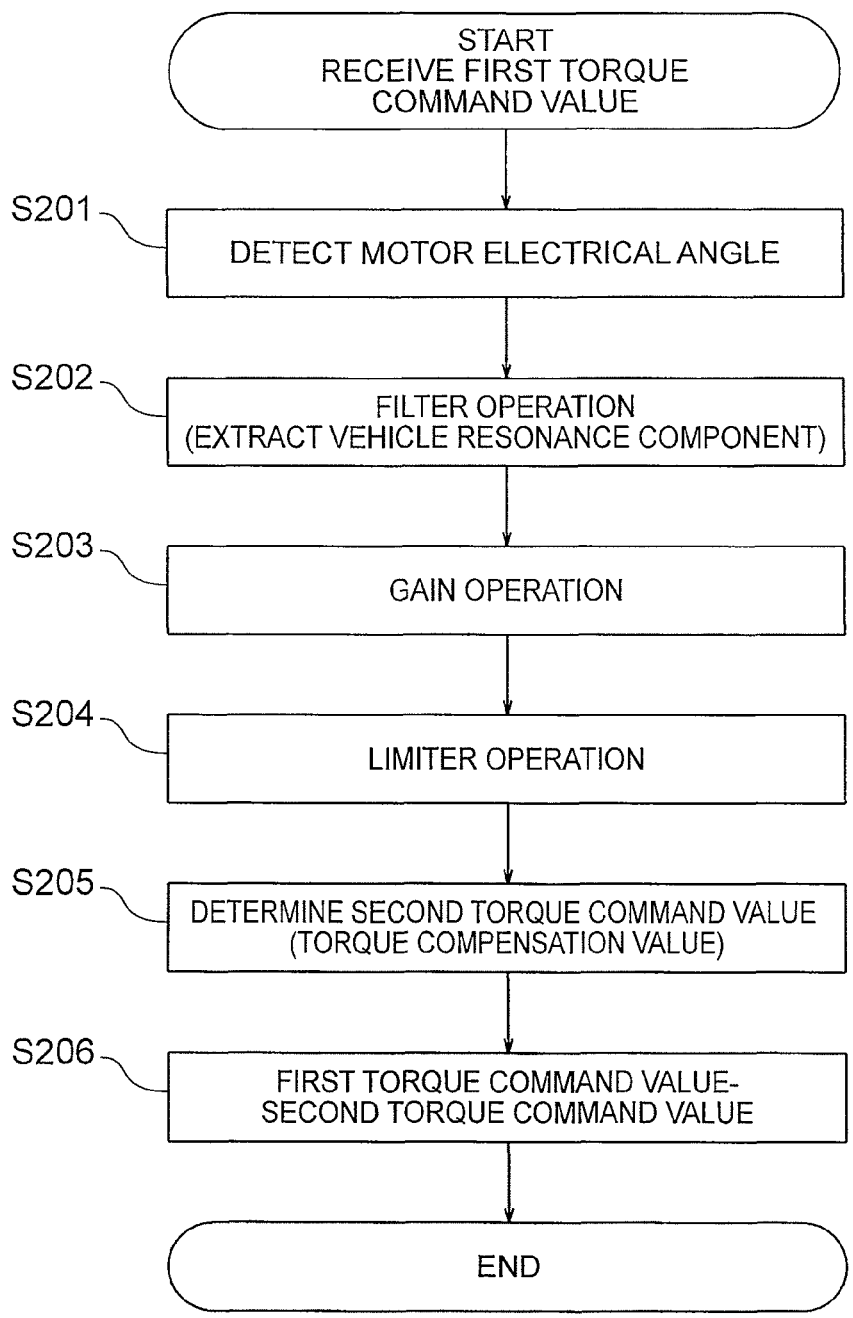
FIG. 3 is a flowchart illustrating feedback processing relating to vehicle resonance compensation in the motor control device for vehicle according to the first embodiment of the present invention.

A description is now given of the calculation routine of the torque compensation value referring to a flowchart of FIG. 3. In Step S201, the electrical angle ω of the motor is input from the motor electrical angle sensor 4 provided to the motor for traveling 3 to the vehicle-resonance-compensation calculation unit 23. Though the description is given of the example where the electrical angle ω of the motor is input as the drive state (data) of the motor for traveling 3 from the motor electrical angle sensor 4 on this occasion, the drive state (data) is not limited to the electrical angle ω of the motor, and at least any one of the electrical angle ω, the motor speed, the motor torque, the motor current, a motor electrical angle estimated from the motor current and the like, and a motor speed estimated from the motor torque and the like, for example, may be used as the drive state (data) of the motor for traveling 3.

In Step S202, ωfil, which is a vehicle resonance frequency component extracted by means of the vehicle-resonance-component extraction filter 24 from the electrical angle ω of the motor, is then calculated. The vehicle-resonance-component extraction filter 24 has a transfer characteristic G(s) having lead/lag elements represented by the following equation (1).

$$G(s)=(\tau 2s+1)/(\tau 1s+1) \quad (1)$$

In the above-mentioned equation, s is the Laplacian operator, and τ1 and τ2 are time constants, and are represented by the following equations (2) and (3).

$$\tau 1=\tfrac{1}{2}\cdot\pi\cdot f\text{max} \quad (2)$$

$$\tau 2=\tfrac{1}{2}\cdot\pi\cdot f\text{min} \quad (3)$$

Figure 2:
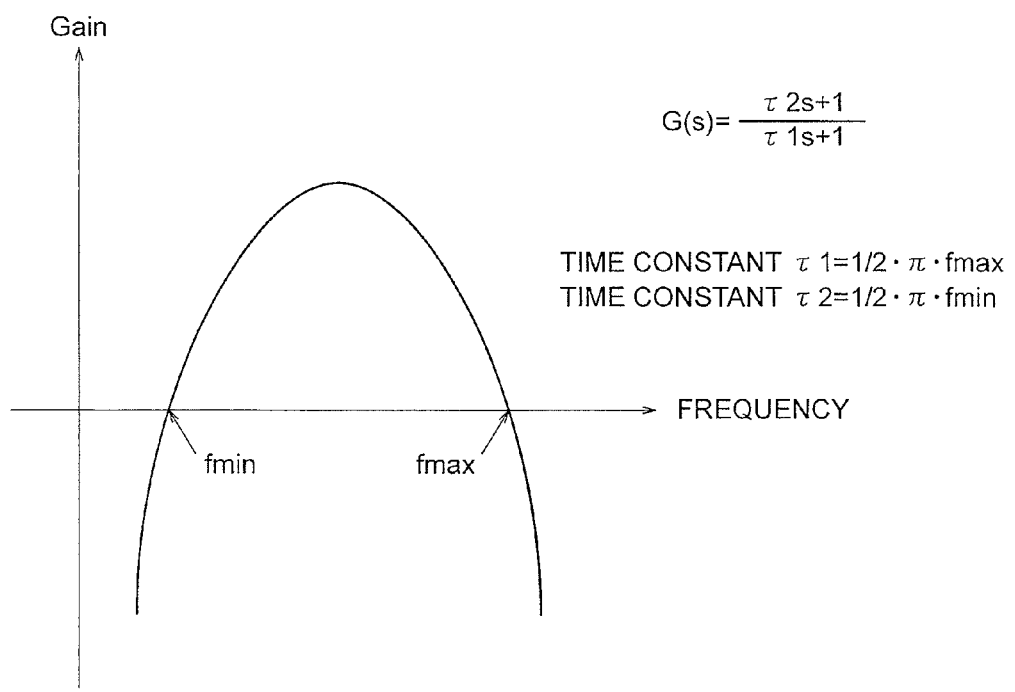
FIG. 2 is an explanatory diagram illustrating, in the form of graph, a first-order lead/lag filter for extracting vehicle resonance frequency components in the motor control device for vehicle according to the first embodiment of the present invention.

On this occasion, as illustrated in FIG. 2, fmin is the minimum of the vehicle resonance frequency, fmax is the maximum of the vehicle resonance frequency, and it is intended that the vehicle-resonance-component extraction filter 24 extracts a signal having a frequency component within a resonance frequency band (or the band and a neighborhood thereof) of the vehicle. For example, if fmin and fmax are respectively set to 8 Hz and 25 Hz, the vehicle-resonance-component extraction filter 24 determines the time constants τ1 and τ2 using these values by means of the calculation according to the above-mentioned equations (2) and (3), thereby extracting only frequency components from 8 Hz to 25 Hz.

On this occasion, the minimum fmin and the maximum fmax of the vehicle resonance frequency (namely, the time constants τ1 and τ2) may be fixed, but may be variable according to the state of the vehicle. In other words, if the vehicle has oscillation detection means (not shown) such as an acceleration sensor as vehicle-resonance-frequency detection means and detects a vehicle resonance frequency which is actually present based on a detected acceleration, thereby changing the minimum fmin and the maximum fmax of the vehicle resonance frequency (namely, the time constants τ1 and τ2) based on the vehicle resonance frequency which is actually present, it is possible to restrain a resonance of the vehicle generated by an unexpected external factor.

Moreover, if there is no oscillation detection means such as an acceleration sensor, because it is apparent that the resonance frequency of the vehicle changes according to the vehicle weight and the inclination of the road surface, which are factors determining the resonance frequency in addition to the elastic systems, the resonance may be restrained by providing means (sensors) for detecting the vehicle weight and the inclination of the road surface as the vehicle-resonance-frequency detection means, and changing the minimum fmin and the maximum fmax of the vehicle resonance frequency (namely, the time constants τ1 and τ2) based on the detected values.

If the vehicle weight increases, for example, the vehicle resonance frequency decreases, and it is thus necessary to set lower values to the minimum fmin and the maximum fmax of the vehicle resonance frequency. Moreover, if weights imposed on the elastic systems acting as resonance sources increase according to the inclination of the road surface, it is also necessary to set lower values to the minimum fmin and the maximum fmax of the vehicle resonance frequency. If there is provided a configuration in which the minimum fmin and the maximum fmax of the vehicle resonance frequency are automatically changed by means of the sensors (not shown) for the vehicle weight and the inclination, the resonance of the vehicle can be more efficiently restrained.

In Step S203, in the gain function unit 25, the following calculation is then carried out using the frequency component ωfil extracted by the vehicle-resonance-component extraction filter 24 and a gain k set in advance, thereby acquiring Tfil.

$$T\text{fil}=k\cdot\omega\text{fil} \quad (4)$$

A vehicle resonance compensation component is then adjusted in the limiter 26 in Step S204. A main purpose of the limiter 26 is to prevent an unexpected external disturbance from generating a large value in the motor angular velocity and adversely affecting the control. The limiter 26 serves to set upper and lower limits to the second torque command value, which is the resonance compensation value generated by the vehicle-resonance-compensation calculation unit 23 for restraining an oscillation caused by the resonance of the vehicle. In other words, the limiter 26 carries out an operation which replaces Tfil by the upper limit if the Tfil generated by the gain function unit 25 is equal to or more than a predetermined upper limit, and replaces Tfil by the lower limit if the Tfil generated by the gain function unit 25 is equal to or less than a predetermined lower limit.

The limiter 26 may operate according to another example. The vehicle resonance frequency is generally low, and the resonance of the vehicle caused by an oscillation source has a feature that the resonance is generated only if the frequency of the oscillation source is low, that is, only in a low speed range of the vehicle. Therefore, the limiter 26 for operating to carry out the resonance compensation only on the low speed side based on the vehicle speed information acquired from the vehicle speed sensor (not shown) may be provided. Specifically, the limiter 26 may include a vehicle speed input unit for receiving a signal from the vehicle speed sensor provided on the vehicle, and may switch on/off of (carry out/omit) the output of the second torque command value to the adder 20 according to the vehicle speed. In other words, if the vehicle speed is equal to or more than a predetermined threshold set in advance, the second torque command value Tcmp is not output to the adder 20, and the motor for traveling 3 is controlled directly according to the first torque command value Tref just as generated by the vehicle control unit 1 without carrying out the resonance compensation, and, on the other hand, if the vehicle speed is less than the predetermined threshold set in advance, the second torque command value is output to the adder 20, thereby compensating the first torque command value, and controlling the drive of the motor for traveling 3 according to a torque command value Tref_cmp after the resonance compensation. Alternatively, instead of the limiter 26, the vehicle-resonance-compensation calculation unit 23 may carry out the switching according to the vehicle speed. In other words, the vehicle-resonance-compensation calculation unit 23 may include a vehicle speed input unit for receiving a signal from the vehicle speed sensor provided on the vehicle, and may switch on/off of (carry out/omit) the generation operation of the second torque command value by the vehicle-resonance-compensation calculation unit 23 according to the vehicle speed. In other words, if the vehicle speed is equal to or more than the predetermined threshold set in advance, the second torque command value Tcmp is not generated, and, on the other hand, if the vehicle speed is less than the predetermined threshold set in advance, the vehicle-resonance-compensation calculation unit 23 may generate the second torque command value Tcmp.

In Step S205, the numerical value obtained after the calculation by the limiter 26 is then determined as the second torque command value Tcmp for use as the torque compensation value.

In Step S206, the adder 20 calculates the torque command value Tref_cmp from the resonance compensation value Tcmp (second torque command value) calculated by the vehicle-resonance-compensation calculation unit 23 and the torque command value Tref (first torque command value) input from the vehicle control device 1 by using the following equation (5).

$$Tref\_cmp = Tref \text{ (first torque command value)} - Tcmp \text{ (second torque command value)} \tag{5}$$

After the routine for calculating the torque compensation value of FIG. 3 acquires the torque command value Tref_cmp after the torque ripple compensation in this way, the various calculations such as the dq-axis transformation and the three-phase conversion are carried out by the current command calculation unit 21 based on the torque command value Tref_cmp after the torque ripple compensation, the control for the three-phase AC is determined, and the power switching elements (not shown) in the inverter 22 are driven so as to cause the DC component from the battery 8 to output the desired three-phase AC waveforms, thereby driving the motor for traveling 3.

The motor for traveling 3 is connected to the driving wheels 6 via the transmission 5, the driving wheels 6 are rotated by the torque of the motor for traveling 3, and the vehicle gains the propulsion force by the reaction force from the ground. The transmission 5 may be a simple speed reduction gear, or may by a speed change gear having a mechanism which can change among several speed reduction ratios on this occasion.

As described above, according to this embodiment, the motor control device for vehicle includes: the vehicle control device 1 for generating the first torque command value Tref according to the state quantities of the vehicle obtained from the various sensors 7; the vehicle-resonance-compensation calculation unit 23 for extracting the frequency components such as the torque ripple, which generate a vehicle resonance, out of the oscillation source components, which can be detected according to the motor drive state such as the electrical angle ω of the motor for traveling 3, by means of the vehicle-resonance-component extraction filter 24, and generating the second torque command value Tcmp, which is the resonance compensation value for carrying out the feedback control for the extracted frequency components; and the adder 20 for generating the torque command value Tref_cmp by subtracting the second torque command value Tcmp from the first torque command value Tref, and the motor for traveling 3 is controlled according to the torque command value. It is thus possible to provide a preferred motor control device for vehicle which can provide the feedback control for resonance frequency components of the vehicle out of the oscillation sources such as the torque ripple acquired from the motor drive state such as the angular velocity ω of the motor, thereby eliminating the resonance frequency of the vehicle, restraining oscillations and noises generated on the vehicle by the resonance, and providing passengers with feel of comfort.

Though the description is given while assuming that a control unit for carrying out the calculation relating to the vehicle-resonance-compensation calculation unit 23 and the current command calculation unit 21 and an inverter unit are unified, the control unit and the inverter unit may be independently provided. In other words, the inverter 22 may be provided outside the motor control device 2.

Moreover, though the motor for traveling 3 is described as a three-phase AC motor, the motor for traveling 3 maybe a permanent magnet motor or an induction motor, and the motor control device for vehicle may be applied to all motors which possibly generate a torque ripple. The motor control device for vehicle can provide the same effect in this case as in the first embodiment.

Moreover, though the vehicle-resonance-component extraction filter 24 is described as a first-order lead/lag filter, the vehicle-resonance-component extraction filter 24 may be a second-order filter, and a well-known filter which can extract a signal in a neighborhood of the resonance frequency is applicable. In this case, the control can be provided while the frequency is more restricted.

In the above, the embodiment of the present invention has been described. However, the scope of the present invention is not limited thereto, and the present invention may be implemented by being subjected to various modifications.

What is claimed is:

1. A motor control device for a vehicle, comprising:
a first torque generation unit for generating a first torque command value for controlling drive of the motor for traveling according to a state quantity of the vehicle supplied from at least one type of sensor provided on the vehicle;
a second torque generation unit for extracting a frequency component generating a resonance of the vehicle which is one of frequency components of an oscillation source of the vehicle generated when the motor for traveling is driven, and generating a second torque command value serving as a resonance compensation value for the first torque command value based on the extracted frequency component; and
a drive torque generation unit for subtracting the second torque command value generated by the second torque generation unit from the first torque command value generated by the first torque generation unit, thereby outputting a result of the subtraction as a drive torque command value for the motor for traveling,
wherein the motor for traveling is driven based on the drive torque command value, and wherein the second torque generation unit includes a vehicle speed input unit for receiving an input of a speed of the vehicle, and the second torque generation unit switches an operation for generating the second torque command value on and off according to the speed of the vehicle.

2. The motor control device for a vehicle according to claim 1, wherein:
the second torque generation unit extracts the frequency component generating the resonance of the vehicle from the frequency components of the oscillation source according to a drive state of the motor for traveling so as to generate the second torque command value; and
the drive state of the motor for traveling comprises at least one of a motor electrical angle, an estimated value of the motor electrical angle, a motor speed, an estimated value of the motor speed, a motor torque, and a motor current of the motor for traveling.

3. The motor control device for a vehicle according to claim 1, wherein:
the motor for traveling includes drive state detection means for detecting the drive state of the motor for traveling; and
the second torque generation unit extracts the frequency component generating the resonance of the vehicle from the frequency components of the oscillation source according to the drive state of the motor for traveling detected by the drive state detection means so as to generate the second torque command value.

4. The motor control device for a vehicle according to claim 1, wherein the second torque generation unit includes a first-order lead/lag filter, and generates the second torque command value using the first-order lead/lag filter.

5. The motor control device for a vehicle according to claim 1, wherein the second torque generation unit further includes a limiter for limiting the second torque command value by an upper limit and a lower limit.

6. A motor control device for a vehicle. comprising:
   a first torque generation unit for generating a first torque command value for controlling drive of the motor for traveling according to a state quantity of the vehicle supplied from at least one type of sensor provided on the vehicle;
   a second torque generation unit for extracting a frequency component generating a resonance of the vehicle which is one of frequency components of an oscillation source of the vehicle generated when the motor for traveling is driven, and generating a second torque command value serving as a resonance compensation value for the first torque command value based on the extracted frequency component: and
   a drive torque generation unit for subtracting the second torque command value generated by the second torque generation unit from the first torque command value generated by the first torque generation unit, thereby outputting a result of the subtraction as a drive torque command value for the motor for traveling,
   wherein the motor for traveling is driven based on the drive torque command value,
   the vehicle includes vehicle-resonance-frequency detection means for detecting a resonance frequency of the vehicle, and
   the second torque generation unit includes a first-order lead/lag filter, functions to generate the second torque command value using the first-order lead/lag filter, and changes a time constant of first-order lead/lag filter according to the detected resonance frequency of the vehicle.

7. A method for controlling a motor of a vehicle, comprising:
   generating a first torque command value for controlling drive of the motor according to input from at least one sensor;
   extracting a frequency component which is one of frequency components of an oscillation source generated when the motor is operated;
   generating a second torque command value serving as a resonance compensation value for the first torque command value based on the extracted frequency component;
   subtracting the second torque command value from the first torque command value;
   outputting a result of the subtraction as a drive torque command value for the motor;
   driving the motor based on the drive torque command value;
   receiving a speed of the vehicle as input; and
   switching an operation for generating the second torque command value on and off according to the speed of the vehicle.

* * * * *